United States Patent [19]
Joppich

[11] 3,872,301
[45] Mar. 18, 1975

[54] AUTOMATICALLY TEMPERATURE-COMPENSATED ELECTRO-OPTIC CIRCUIT

[75] Inventor: Mandred Joppich, Munich, Germany

[73] Assignee: Fritz Schwarzer GmbH, Munich, Germany

[22] Filed: Mar. 15, 1974

[21] Appl. No.: 451,611

[52] U.S. Cl. .................................. 250/205, 250/229
[51] Int. Cl. ............................ G01j 1/32, G01d 5/34
[58] Field of Search ........... 250/205, 209, 210, 237, 250/237 G, 229

[56] References Cited

UNITED STATES PATENTS

| | | | |
|---|---|---|---|
| 3,014,134 | 12/1961 | Bower | 250/205 |
| 3,775,617 | 11/1973 | Dubauskas | 250/205 |
| 3,809,895 | 5/1973 | Taisne | 250/237 G |

*Primary Examiner*—James W. Lawrence
*Assistant Examiner*—T. N. Grigsby
*Attorney, Agent, or Firm*—Joel Wall; William C. Nealon; H. R. Berkenstock, Jr.

[57] ABSTRACT

An automatically temperature-compensated electro-optic circuit. There is disclosed an electro-optic circuit including optical mask, light emitting diodes, and photo transistors coupled with operational amplifier circuitry to provide automatic compensation for variations in parameters of the light emitting diodes and photo transistors due to temperature variations. With the inclusion of the invention in an electro-medical monitor an output signal is thus maintained approximately constant for a given position of optical mask regardless of temperature variations.

11 Claims, 2 Drawing Figures

AUTOMATICALLY TEMPERATURE-COMPENSATED ELECTRO-OPTIC CIRCUIT

BACKGROUND OF THE INVENTION

1. Field of the Invention

The present invention relates generally to automatic temperature compensation for semi-conductor circuitry, and more specifically relates to automatic temperature compensation of light emitting diode and photo transistor circuitry utilized in electro-medical monitoring systems.

2. Description of Prior Art

EKG monitoring systems usually requires means for producing and maintaining an EKG signal for review and analysis. Ordinarily, chart-paper recorders are utilized. These chartpaper recorders usually use galvanometer pens and semi-conductor amplifier and semi-conductor driver circuitry. Driving circuitry for galvanometer pen movement may utilize position feedback for stabilization and accuracy. This is the subject matter of another patent application filed in the name of Wolfgang Atzinger et al and assigned to Fritz Schwarzer, GMBH, the assignee of the present invention. This other application, entitled "Remote-Position Indicator for Follow-Up Devices in Recording Systems" was filed on Feb. 8, 1974, and bears U.S. Ser. No. 440,884. Background material disclosed in the above application is incorporated herein by reference. Optical masks of the present application may be similar or identical to optical masks disclosed and described in the referenced patent application.

Problems associated with this EKG recording technique include semi-conductor circuitry temperature compensation problems. Particularly, with respect to optical electronic circuitry, special temperature compensating techniques may be required. Severe temperature-induced parameter variations which render EKG monitoring somewhat inaccurate burden the medical practitioner. The present invention provides a solution to certain temperature compensation problems of the prior art. It renders measurement and monitoring of EKG and other patient vital-signs substantially more accurate over large variations of ambient temperature.

SUMMARY OF THE INVENTION

An electro-optic circuit automatically compensates its electrical parameter variations due to temperature changes. The circuit includes a power supply, a signal generator which provides at least two signals, an electrical parameter variation sensor for sensing changes in parameters of the electrical circuitry due to temperature changes, a signal generator controller for maintaining the signals constant, and a device which operates on the signals and provides an output signal.

A further feature of the present invention includes an optical mask with apertures, the mask being displaceable in response to a mechanical input signal, an electrically activated light source for shining light on the mask and through the apertures, and a light sensing device for converting the light into electrical signals. Advantages of this invention include increased accuracy of measurement over a large ambient temperature range.

It is thus an object of the present invention to provide improved electro-optic circuitry.

It is another object of the present invention to provide an improved EKG monitoring system.

It is yet another object of the present invention to provide an EKG monitoring system with electro-optic circuitry that is automatically temperature compensated.

Other objects and advantages of the present invention will be obvious to one of reasonable skill in the art after referral to a detailed description of the appended drawings wherein:

DESCRIPTION OF THE PREFERRED EMBODIMENTS

Figures 1, 2:
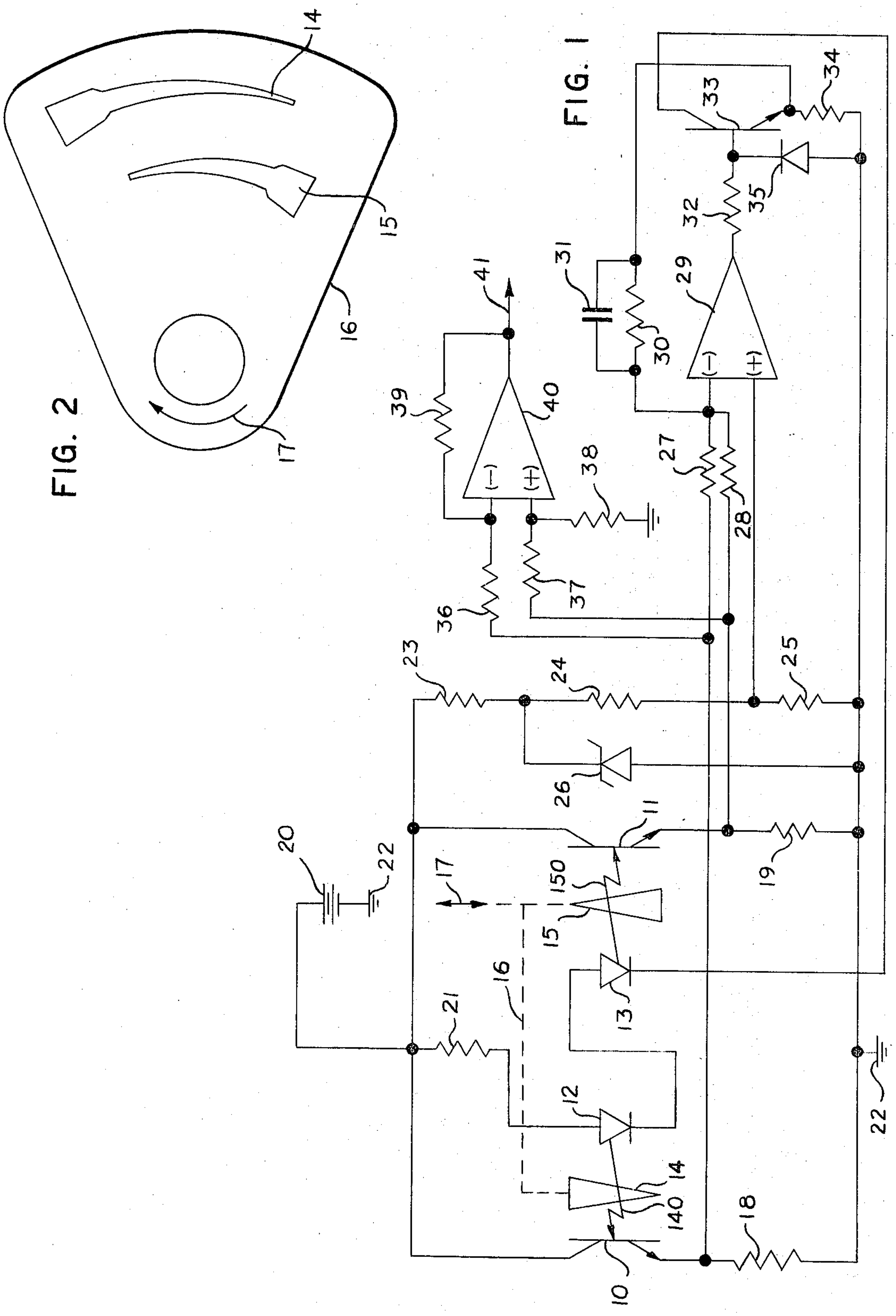
FIG. 1 depicts an illustrative embodiment of the present invention.
FIG. 2 depicts an optical mask to be used with the illustrative embodiment of FIG. 1.

In FIG. 1, DC power supply or battery supply 20 is connected to one end of resistor 21, the other end being connected to the anode of LED 12. The cathode of LED 12 is connected to the anode of LED 13, the cathode of LED 13 being connected to the collector of transistor 33. Battery supply 20 is likewise connected to collectors of photo transistors 10 and 11. Light emitting diodes 12 and 13 are optically coupled respectively to optical inputs of photo diodes 10 and 11 as indicated by light symbols 140 and 150 respectively. Light is emitted from LEDs 12 and 13 through apertures 14 and 15 respectively of optical mask 16. Optical mask 16 is indicated as having directional movement 17.

FIG. 2 depicts mask 16 of FIG. 1. Apertures 14 and 15 are shown. Movement 17 is indicated as linear in FIG. 1 because of the geometrical positioning of the apertures in FIG. 1, but is shown in FIG. 2 as rotational because of the rotatable embodiment presented there. The embodiment of FIG. 2 is preferred, but a translationally-displaced optical mask system may be employed with equal operational performance if system conditions indicate such a preference.

Returning to FIG. 1, emitters of photo transistors 10 and 11 are connected respectively to one end of resistor 18 and one end of resistor 19. The other ends of resistors 18 and 19 are connected to ground 22. Emitters of photo transistors 10 and 11 are also connected respectively to one end of resistor 27 and one end of resistor 28 respectively. The other ends of resistors 27 and 28 are connected together and extended to the inverting input of amplifier 29. Emitters of photo transistors 10 and 11 are further extended to one end of resistor 36 and one end of resistor 37 respectively, the other ends of resistors 36 and 37 being extended to inverting and non-inverting inputs respectively of operational amplifier 40.

Operational amplifier 40 provides information output on conductor 41. Output conductor 41 is coupled back to inverting input of operational amplifier 40 through feedback resistor 39. Resistor 38 is connected from the non-inverting input of operational amplifier 40 to ground and provides proper operational amplifier biasing stability.

Operational amplifier 29 provides output to resistor 32. The other end of resistor 32 is connected to the cathode of diode 35, the anode being connected to ground. Cathode of diode 35 is also connected to the base of transistor 33. Collector of transistor 33 is connected back to the cathode of LED 13 as was mentioned earlier. Emitter of transistor 33 is connected to one end of resistor 34, the other end being connected to ground. Also, emitter of transistor 33 provides feedback for operational amplifier 29, and is connected to one end of resistor 30 and one side of capacitor 31. The other side of capacitor 31 and the other end of resistor 30 is connected to negative input of amplifier 29.

Finally, in describing this circuitry connection, resistors 23, 24, and 25 are connected in series between battery supply 20 and ground 22. Zener diode 26 is connected between the junction of resistors 23 and 24, and ground. And, connection is made between the junction of resistors 24 and 25, and the non-inverting input of operational amplifier 29.

In operation, optical mask 16 is mechanically acted upon by physical force to assume a given position. Detail is provided in the referenced application. The force may be translational (resulting in motion depicted in FIG. 1), rotational (resulting in motion depicted in FIG. 2), or of another kind. The acquired mask position permits certain quantities of light to pass from LED 12 through aperture 14 and from LED 13 through aperture 15. The light which passes through each of these apertures is sensed by respective photo transistors 10 and 11, and is converted to respective photo transistor currents. Currents flowing through emitters of photo transistors 10 and 11 are proportional to amounts of light received at their respective light inputs. Current flowing through the emitter of photo transistor 10 creates a first voltage drop at the junction of resistor 18 and resistor 27. Current flowing through the emitter of photo transistor 11 creates a second voltage drop at the junction of resistor 19 and resistor 28. These two voltage drops or voltages are likewise extended to one end of resistor 36 and one end of resistor 37 respectively. These two voltages are summed in resistors 27 and 28 and provide a summed input to the inverting input of operational amplifier 29. The other input to operational amplifier 29 is a DC voltage extended to the non-inverting input, which does not vary appreciably. It is a reference voltage and is provided for reference and stability purposes.

LED's 12 and 13 are constructed from gallium arsenide and photo transistors 10 and 11 are constructed from a silicon compound. These materials have opposite temperature coefficients. If in response to temperature variation in a particular direction, current in the light emitting diodes is made to increase, amplification or gain of the photo transistors is made to decrease and vice versa. Thus, there is provided an initial temperature compensation feature of the present invention which is inherent in the construction of these components.

There is a further important compensation feature of the invention, the operation of which is now described. Due to physical location or environment, the ambient temperature of this circuitry may be increasing which can cause LED's 12 and 13 to emit more light. This increased light emission passes inherently through apertures through apertures 14 and 15 respectively to light inputs of photo transistors 10 and 11 respectively. This tends to cause currents through emitters of photo transistors 10 and 11 to increase. This increasing current is reflected as increasing voltage developed across resistors 18 and 19, which is further impressed on resistors 27 and 28 respectively and to resistors 36 and 37 respectively. Since these provide the inputs to amplifier 40, the output signal is increased producing error in the final output signal as a function of heat effect on the circuit. (This will be considered in more detail below.) The increasing voltage on resistors 27 and 28 also causes an increased signal summation to be input to the inverting input of operational amplifier 29 which in turn causes a decreased output from that amplifier. The decreased or decreasing output is impressed on base of transistor 33 through resistor 32. Decreased voltage on base of transistor 33 causes transistor 33 to conduct less. The effective "resistance" of transistor 33 is thus increased, which decreases current flow through light emitting diodes 12 and 13, and thereby reduces light output therefrom. Reduced light output causes less current to flow through emitters of photo transistors 10 and 11 respectively thereby reducing the output signal on conductor 41 to the correct value. This is a closed loop or dynamic compensation system, where a temperature variation tendency is immediately corrected. In this manner, automatic temperature compensation is achieved.

The feedback connection from emitter of transistor 33 back to the inverting input of operational amplifier 29 controls gain and stability of that operational amplifier in a manner well known in the art. Diode 35 is in the circuit to prevent high reverse voltages from developing between emitter and base of transistor 33, thus protecting transistor 33. Forward voltage of diode 35 is about 0.5 volts.

If a decreasing temperature change were experienced instead of the increasing change illustrated, then the changes developed by operational amplifier 29 would be in a direction opposite to that described above and automatic temperature compensation would be achieved in the opposite direction.

Referring now to operational amplifier 40. In contrast to signals which were applied to resistors 27 and 28 which resulted in voltage summation, signals applied to resistors 36 and 37 are applied to inverting and non-inverting inputs of amplifier 40 and result in a voltage subtraction. Thus, a difference or differential signal is provided at the output of amplifier 40 in accordance with well known principles of operational amplifier theory. Further detail and description thereof is not necessary for complete understanding of the present invention. Output on conductor 41 represents the difference between the signals.

Since the signals are derived from currents which flow through photo transistors 10 and 11, if current of photo transistors 10 and 11 varies, then the difference signal which depends on those currents likewise varies. If mask 16 is moved in one of directions 17, (for example, in the upper direction shown in FIG. 1) current in photo transistor 11 will increase and current in photo transistor 10 will decrease. Increased current from photo transistor 11 will be applied to positive input of amplifier 40, and decreased current from photo transistor 10 will be applied to inverting input of amplifier 40. Accordingly, when mask 17 is moved upward signal output on conductor 41 increases. This increase is a result of optical mask movement and is intended and desired. A signal increase on the output on conductor 41 resulting from temperature variation is not desired and is automatically compensated as described above.

In the EKG systems described in the above-referenced patent, the galvanometer pen is rotationally moved to scribe on chart paper. The rotational motion is applied to the optical mask as well. It should be understood that measurement of other parameters including other patient vital signs can be made with electro-optical systems of this kind.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electro-optic circuit for automatically temperature compensating parameter variations in said circuit resulting from ambient temperature variations, said electro-optic circuit comprising a power supply, electro-optic means for generating at least two signals, means for sensing said parameter variations by obtaining the sum and difference of said signals, means utilizing said sum of said signals for automatically controlling said generating means to maintain said signals approximately constant, and output means for utilizing said difference of said signals.

2. An electro-optic circuit as recited in claim 1 and wherein said electro-optic means comprises an optical mask containing apertures, means for shining light on said mask and through said apertures, and means for converting said shined-through light to electrical signals.

3. An electro-optic circuit as recited in claim 2 and wherein said light-shining means comprises at least two series-connected current-controlled light emitting diodes powered by said power supply, at least one of said at least two diodes including first means for shining light on said mask and through only one of said apertures, and at least the other one of said at least two diodes including means for shining light on said mask and through only another of said apertures.

4. An electro-optic circuit as recited in claim 3 and wherein said converting means comprises photo transistors.

5. An electro-optic circuit as recited in claim 4 wherein said apertures are two in number and are fashioned in a triangularly tapered manner and wherein the large end portion of one aperture is located adjacent the small apex portion of the other aperture and vice versa.

6. An electro-optic circuit as recited in claim 5 including means for moving said mask so that the intensity of the combined light shined through said two apertures remains constant.

7. An electro-optic circuit as recited in claim 6 and wherein said sensing means includes first operational amplifier means for obtaining said signal sum and second operational amplifier means for obtaining said signal difference.

8. An electro-optic circuit as recited in claim 2 and wherein said sensing means includes first operational amplifier means for obtaining said signal sum and second operational amplifier means for obtaining said signal difference.

9. An electro-optic circuit as recited in claim 8 and wherein said automatic controlling means comprises transistor means responsive to the output of said first operational amplifier means and connected in series with said light emitting diodes and said supply for controlling the current flow through said light emitting diodes.

10. An electro-optic circuit as recited in claim 7 and wherein said automatic controlling means comprises transistor means responsive to the output of said first operational amplifier means and connected in series with said light emitting diodes and said supply for controlling the current flow through said emitting diodes.

11. An electro-optic circuit as recited in claim 10 and wherein said light emitting diodes are constructed from gallium arsenide material and wherein said photo transistors are constructed from silicon material.

* * * * *